United States Patent [19]
Hallerback

[11] 3,955,272
[45] May 11, 1976

[54] METHOD FOR MAKING A STATOR FOR ELECTRIC MOTORS

[75] Inventor: Stig Lennart Hallerback, Vastra Frolunda, Sweden

[73] Assignee: SKF Industrial Trading and Development Company, B.V., Jutphaas, Netherlands

[22] Filed: Oct. 10, 1974

[21] Appl. No.: 513,772

Related U.S. Application Data

[62] Division of Ser. No. 420,877, Dec. 3, 1973.

[30] Foreign Application Priority Data

Dec. 21, 1972 Sweden.............................. 16772/72

[52] U.S. Cl.................................. 29/596; 29/607; 310/42; 310/43; 310/217; 310/218; 310/254
[51] Int. Cl.² ........................................ H02K 15/12
[58] Field of Search ................ 29/596, 609; 310/42, 310/43, 216, 217, 218, 254

[56] References Cited
UNITED STATES PATENTS 3,591,819  7/1971  Laing.................................. 310/217

Primary Examiner—Carl E. Hall
Attorney, Agent, or Firm—Howson and Howson

[57] ABSTRACT

A method for making a stator for electric motors comprised of a plurality of laminations arranged with their sides in the direction of the rotor axis wherein the edge portions of the laminations running in the axial direction are bent upwardly towards the stator bore and maintained in spaced apart relation at a predetermined position and permanently fixed in that position solely by means of a moulding compound. Each lamination stack consists of undivided laminations comprising a north and a south pole wherein each main pole consists of the lamination edges of the two adjacent stacks. The method consists of the steps of positioning the laminations between a pair of inner and outer mould members wherein the inner mould member has means for supporting the terminal edges of the laminations in the predetermined spaced apart relation and disposed along the circumference of a circle and thereafter permanently fixing the terminal edges of the laminations in relation to one another by means of a moulding mass in the spaces between the laminations adjacent the terminal edge portions.

7 Claims, 14 Drawing Figures

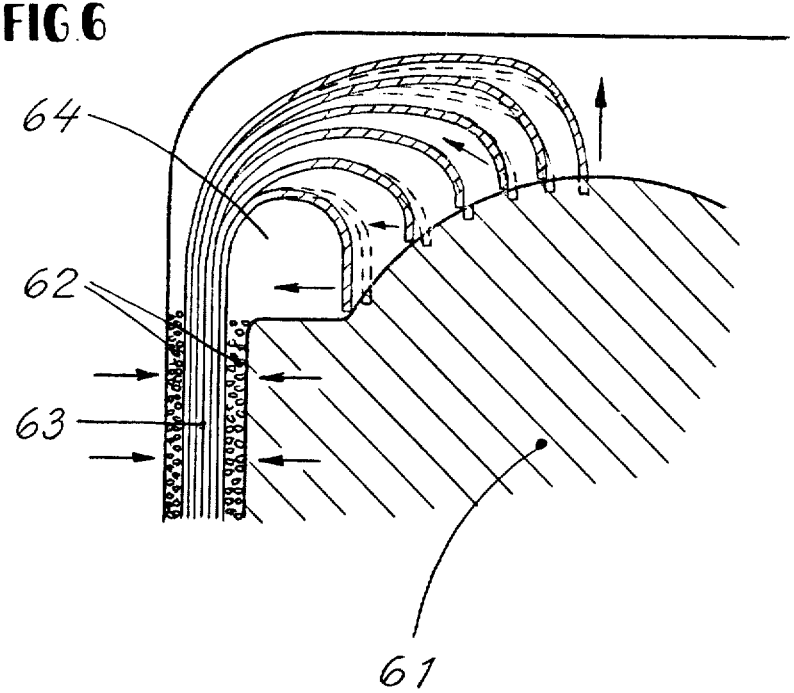
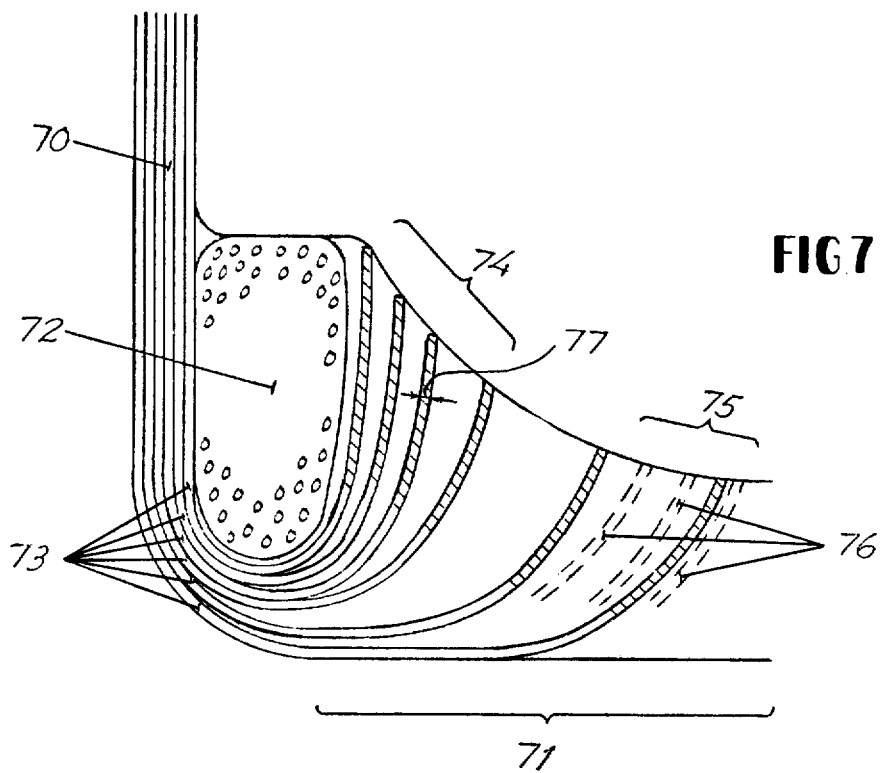

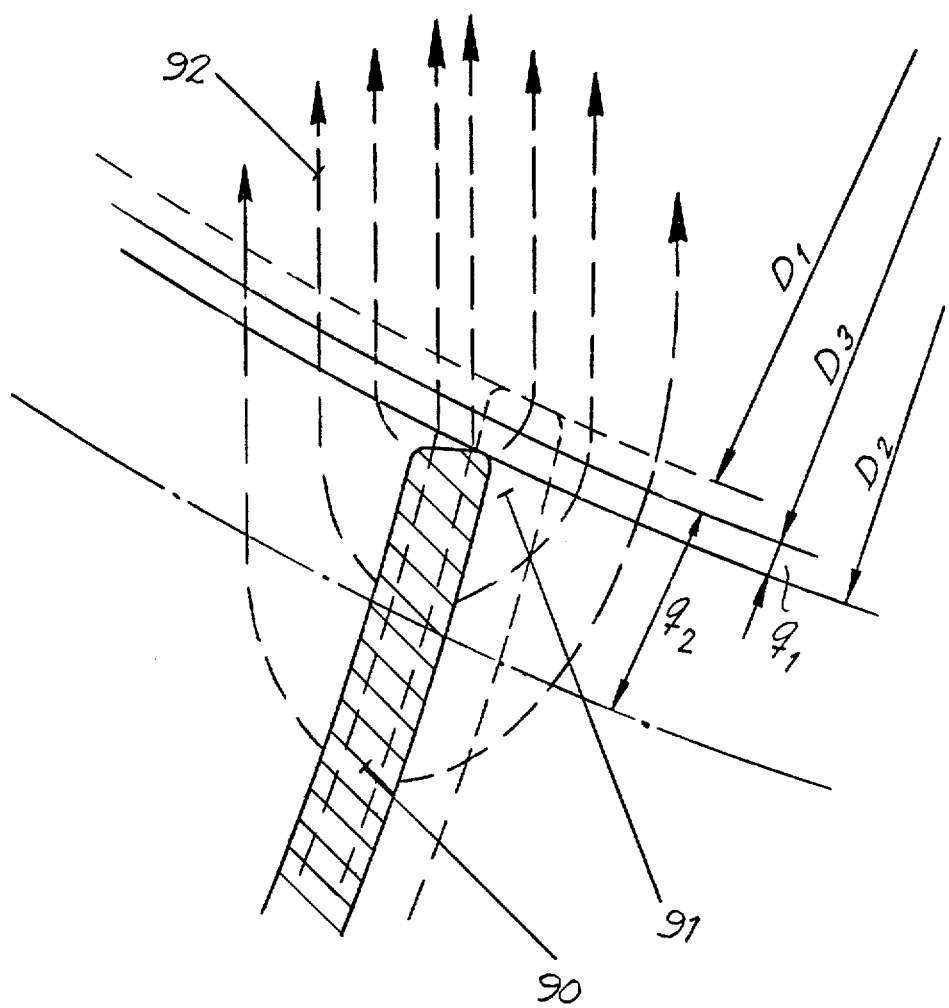

FIG.12A
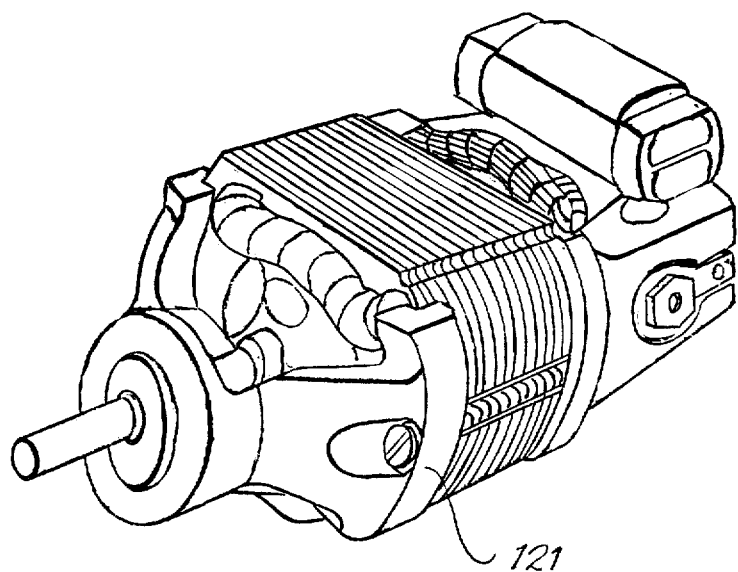
FIG.12B
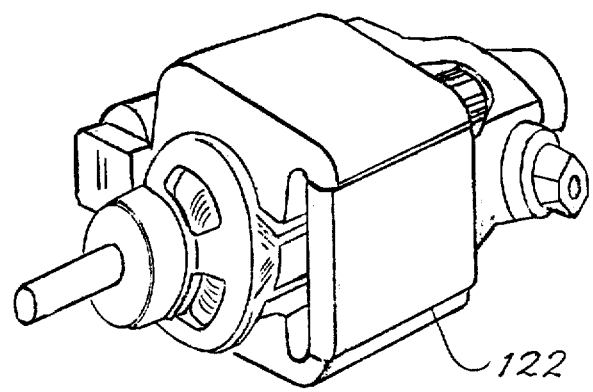

METHOD FOR MAKING A STATOR FOR ELECTRIC MOTORS

This is a divisional, of application Ser. No. 420,877 filed Dec. 3, 1973.

BACKGROUND OF THE INVENTION

The present invention relates to a stator for electric machines, especially machines of the kind constructed with separately wound poles and with yoke components required between these poles for the magnetic flux. The invention also comprises a method for the production of the stator in question.

A large number of motor variants, e.g. commutator motors and shaded pole motors, are provided with stators as specified above. These motors are generally designed for high speeds, have small or medium ratings, and are used for, for instance, fans, blowers, vacuum cleaners and similar appliances. However, these motors have certain serious disadvantages. Their dimensions are large and they are heavy. This is partly on account of the collector system required for certain types of motor but it is also because of the solid and cumbersome pair of poles. The stators have mechanically weak sectors which impede the accurate centering of the rotor system and entail considerable air gap requirements with resultant poor efficiency. The very poor efficiency produces great thermal losses which directly preclude the construction of larger units. The overall picture is of windings that are very compact, surrounded to a very great extent by large masses of sheet metal and consequently have small surfaces for thermal radiation. The stators of these motors are made of laminations stacked at an angle of 90° to the longitudinal axis of the rotor. The lamination sections are of a complex nature and this incurs a great deal of material wastage and expensive joining of the laminations.

A typical example of this technique is the 2-pole commutator motor illustrated in FIG. 1, which shows an end view and a partial section through the motor, the two salient poles 1 and 2 of which are connected by the yoke components 3 and 4. The two poles are encircled by the windings 5 and 6 respectively. The current through the windings generates a magnetic flux 7, which passes from pole 1 through the rotor 8 to pole 2. The magnetic circuit is closed by the return flux in the two yoke components 3 and 4. The sectional areas of these yoke components are accordingly dimensioned to allow the passage of the total flux. A certain pole width, indicated by the numeral 9, is required to run the motor. This width gives the pole a sectional area which is many times that of the yoke components 3 and 4. Consequently the flux density in the poles will be considerably lower than in the yoke components, and certain parts of the salient poles, for instance that indicated by the numeral 10, have slight or zero magnetic flux. The motors as described above always have proportionally very considerable core losses. In addition there is very little possibility of cooling as the windings are almost completely encircled by the masses of iron, yokes and poles. This, together with the core losses, presents serious problems with regard to the cooling of motors of this type.

In order to overcome these deficiences proposals (U.S. Pat. Nos. 2,449,021 and 3,591,819) have previously been made for arranging the stator laminations in the longitudinal direction of the rotor and bending the edges of the laminations in towards the stator bore. Since the magnetic flux into the stator bore will then be entirely determined by the relative positions of the laminations edges, serious problems have been encountered instead in aligning these edges. One way of solving these problems has been to bend the extreme outer part of the edge to form a 90° angle with the laminations and accordingly let the outer ends of the laminations abut each other. Another solution has been to secure special fixtures to the edges of the laminations in order to determine their relative positions. Both of these proposed solutions produce an inaccurate circular-shaped stator bore and it has not proved possible to machine this bore by turning or other similar methods. Apart from the inaccuracy of form of the stator bore the production of these devices is expensive as well. One way to reduce the costs has been to divide the laminations and produce stacks that can be slid into each other. Such an arrangement, however, produces heavy losses as the magnetic flux has to pass an air gap.

SUMMARY OF THE INVENTION

It has, however, according to the present invention been possible to eliminate the above mentioned drawbacks by producing an electric motor having a stator which is characterized thereby that the laminations of the stator are arranged as a stack having its sides in the axial direction of the stator, the edge portions of the laminations running in the axial direction being bent towards the stator bore and maintained in spaced apart relation at a position predetermined with regard to the magnetic flux lines by the aid of a moulded compound, each lamination stack consisting of undivided laminations being arranged to encircle a north pole and a south pole.

The stator according to the invention can be designed in such a way that the stator windings are arranged either around the edge portions of laminations adjacent to the stator bore or around the yoke components of the laminations.

A very large advantage is obtained if in the latter case the windings are substantially free from mould compound and an open air gap is formed between the yoke components of the stator and the rotor. It is thereby possible to obtain a very efficient cooling for the stator windings. These will have a free radiation surface both outwards and inwards, at the same time as cooling by natural or forced convection can be used. The possibility of increasing the cooling capacity of the stator by these large cooling surfaces will on the whole contribute towards a cooler motor, which in turn improves the efficiency and the power output. The windings can easily be applied mechanically.

The motor will have considerably smaller dimensions as compared to a corresponding, conventionally built motor, as the pole according to the present invention will have the same sectional area for the magnetic flux as the yoke components and all superfluous masses of iron thereby can be eliminated. The masses of copper may also be considerably reduced right down to one third as compared to conventional motors having an equal power output.

The lamination wastage can be reduced nearly to nil as the laminations can be manufactured as rectangles or parallelograms and the production costs are thereby correspondingly reduced. The laminations may also be given non-uniform thickness for adjusting the flux resistance.

It is easy to arrange additional insertions of induction rings, so called shaded poles by utilizing the space between the separate laminations for insertion of laminations having short circuited current paths. The unevenly bent laminations may be of different lengths but this can, as mentioned hereabove, resourcefully and easily be compensated for by varying lamination thickness in order to reach a uniform flux resistance.

As the laminations are made without any lamination wastage it is advantageous to use sheet metal qualities having an "aligned" magnetic flux character, without appreciably influencing the total costs.

A thermosetting resin or the like can be used as the mould compound. For obtaining a good dispersion of the magnetic flux the compound may be magnetically conductive.

The stators according to the invention are manufactured thus that the previously bent laminations with windings are inserted into a mould, whereupon an internal centre mandrel is inserted and a mould compound finally is introduced into the cavity and brought to set.

By arranging the laminations edges adjacent to the stator bore to delimit a cavity having a diameter smaller than the mandrel prior to the insertion of this, it is obtained that the laminations edges are pressed outwards and abut the mandrel when this is inserted into the cavity.

By means of this flexible self-adjustment against the center mould mandrel, eventually in combination with electric orientation of lamination distance etc., it is obtained a stator having extremely narrow tolerances for the stator bore. The air gap geometry between rotor and stator is thereby improved thus facilitating provision of smaller air gaps in the motor which in turn will improve significantly the efficiency and output of the motor.

The envelope surface of the mandrel may be provided with grooves or ridges for guiding the laminations edges.

If the windings are arranged around the yoke components of the laminations it is essential that the mandrel is pressed against these during the pouring in order not to allow the mould compound to enter into the windings.

The invention will herebelow be further described with reference to the accompanying drawings;

FIGS. 1 and 2 of which show an end view and a cross-sectional view of a motor according to the invention;

FIG. 6 is a similar view showing another embodiment of the invention;

FIGS. 7 and 8 show a partial section through a stator designed with especial magnetic flux relations;

FIG. 9 shows a detail of a stator lamina with magnetic flux arrows;

FIGS. 12a and 12b show a perspective view of a motor according to the invention compared to a conventional motor having equal performance characteristics.

DESCRIPTION OF SPECIFIC EMBODIMENTS

Figure 1:
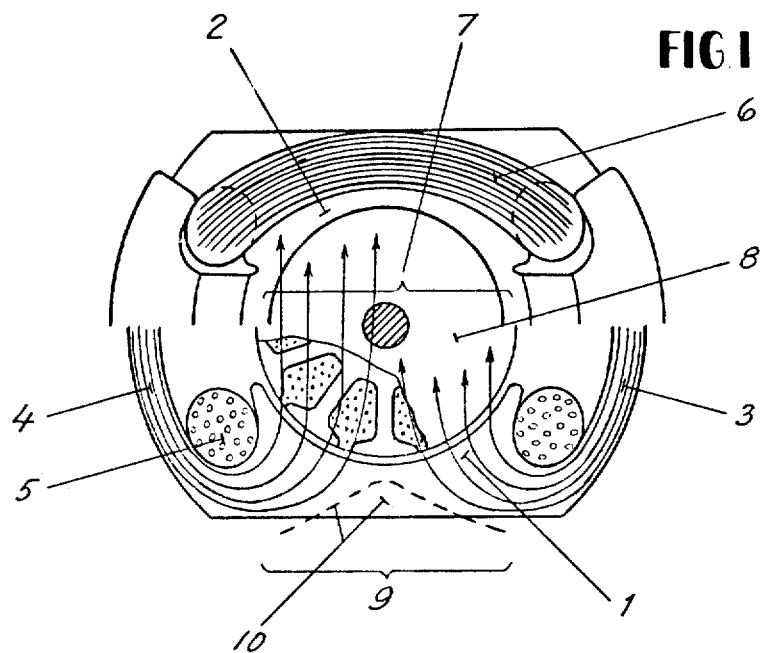
Figure 2:
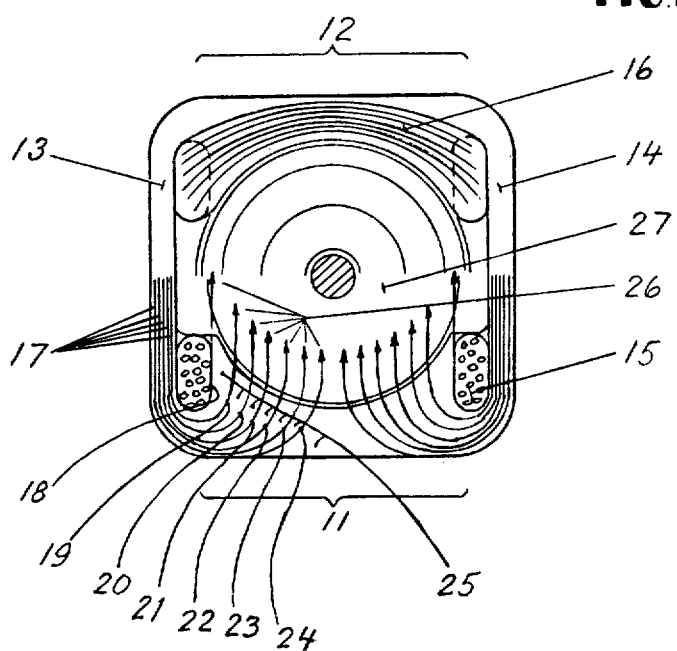

In FIG. 2 the salient poles marked with brackets 11 and 12 are connected by yoke components 13 and 14 so that a closed magnetic flux is generated when coils 15 and 16 are fed with a current. The yoke components are formed by a number of thin laminations 17 which are pressed against each other, the interengaging surfaces of which are oriented in the axial plane of the motor. The yoke components 13 and 14 continue in the pole portions 11 and 12 by means of an unbroken extension of the laminations 17, at the same time as these are aligned and spaced apart from each other in order to follow the imagined and ideal flux curve 18–24 which continues into the salient pole 11. The space 25 between the laminations thus formed as a flux curve, is filled with a plastics compound, by which the laminations are secured in reciprocal relation and which gives such a width to the salient pole 11 that the best possible magnetic flux dispersion 26 is obtained for the rotor 27.

Figure 3:
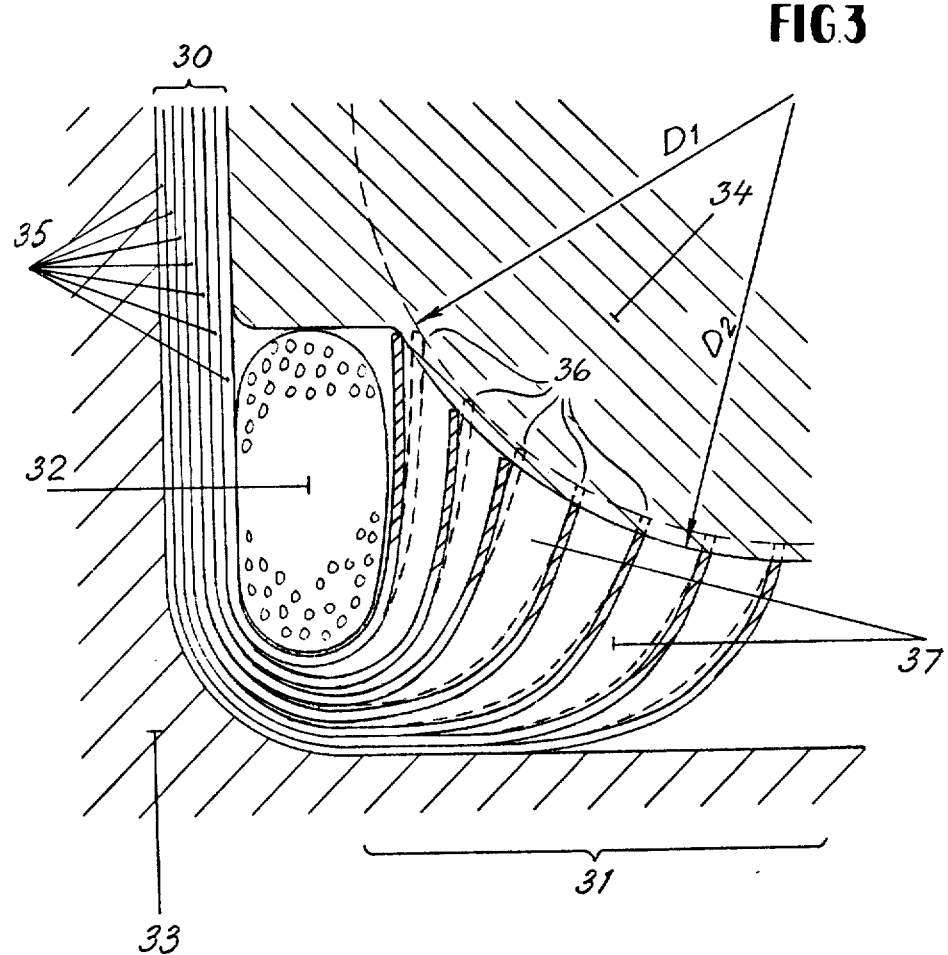
FIG. 3 shows a partial section of a stator portion together with moulding tool.

FIG. 3 shows a partial section through a yoke component 30, a pole portion 31, a winding 32 and a plastics moulding tool comprising an outer mould 33 and a center mandrel 34. The yoke component 30 consists of seven laminations 35. These laminations are bent in such a manner that they follow imagined ideal magnetic flux lines which like a fan runs into and through the salient pole 31. When the stack of laminations and the winding 32 have been placed into the outer mould, the laminations edges 36 will have a position delimited by a circular cylinder having a somewhat smaller diameter $D_1$ than the desired stator bore diameter $D_2$. By inserting the center mandrel 34, the diameter of which is $D_2$, the end surfaces 36 of the laminations are pushed outwards to diameter $D_2$ where they will be secured in desired interrelation by aid of plastics mould compound 37. This flexing outwards of the thin laminations will guarantee a metallic contact to $D_2$ whereby a very good tolerance can be obtained in the stator bore.

One demand which must be put on an electric motor is that the air gap between stator and rotor must be constant. This air gap is determined by the accuracy of the rotor and stator surfaces facing each other and by the fitting of the rotor in the bearing. A conventional rotor is easy to machine by turning or the like and it can be given a very accurate cylindric surface. The stator bore according to the invention and other proposed embodiments with the laminations edges facing the stator bore are, however, difficult to machine. A turning tool would, for instance, stamp at the laminations edges and would very soon be worn out due to fillers such as silica or glass in the plastics compound according to the present invention. The shape of the stator makes it furthermore difficult to chuck up in a lathe and the operation should become extremely expensive.

Another demand which has to be fulfilled by a stator according to the invention is that the direction of the magnetic flux is not altered, and for this reason it is necessary to obtain a good binding between the laminations and the plastics. The distance between the separate laminations must be secured with no other aid than the plastics and it is also necessary to obtain a sinusoidal flux dispersion if that is desired.

All these demands are solved according to the invention in the manner stated hereabove and as further described in connection to FIGS. 4 and 5. The laminations 40 are here shown embedded in the plastics 41 and the lamination edges 42 which are pressed outwards by the aid of a center mandrel define in cross-section a perfect circle. The plastics used has a tendency of shrinking and a wavy-formed line 43 appears between the laminations 40. A desired larger air gap is thereby obtained and at the same time it is secured that the plastics when the motor is getting warmer will not bulge out from the laminations edges.

Figure 5:
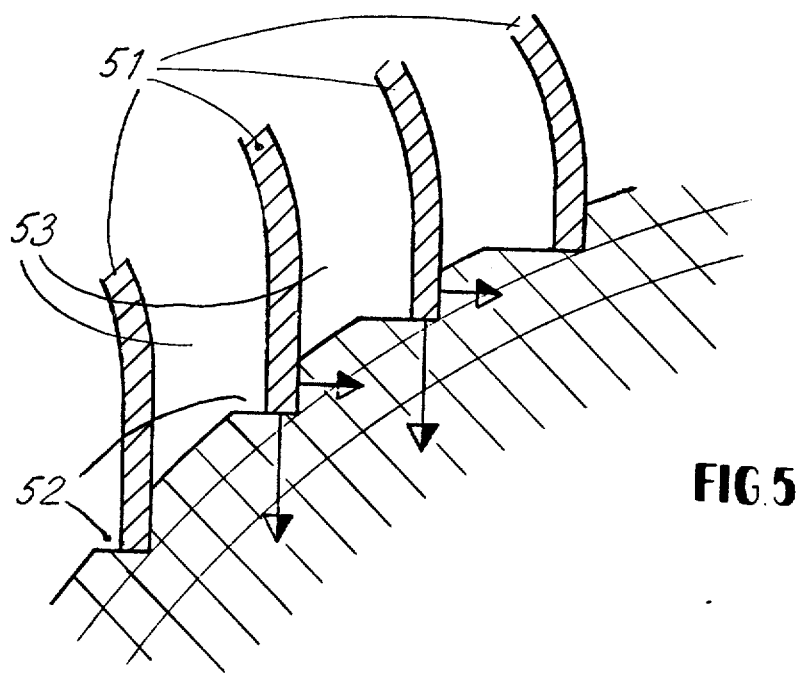

FIG. 5 shows a further manner to guide the lamination 51. The center mandrel may be provided with grooves 52 against which the laminations edges are pressed. It is also in this case, which is shown in section, obtained a perfect circle. The moulded plastics is further distanced from the lamination edges.

Figure 4:
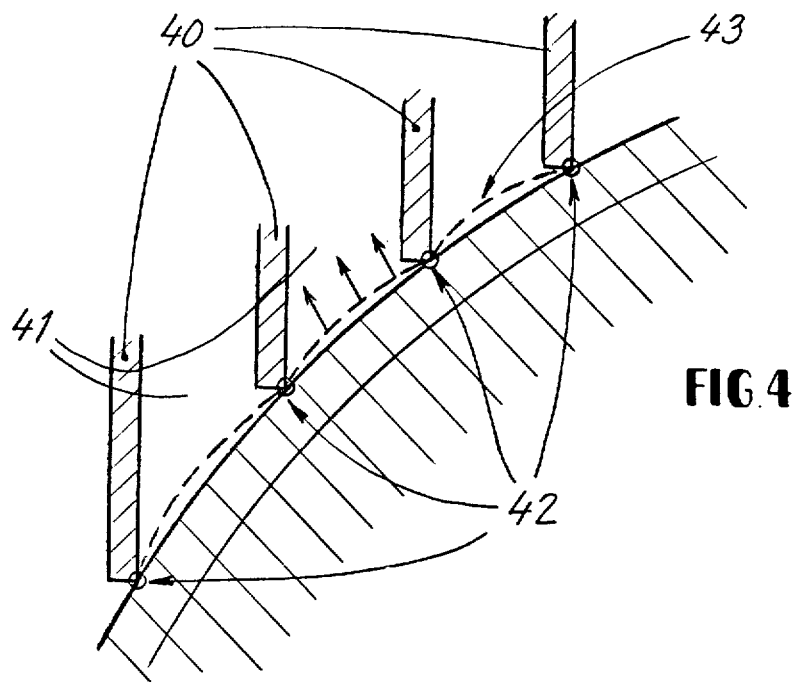
FIGS. 4 and 5 show a partial section of the laminations embedded in plastics and abutting the center mandrel.

Machining of the stator bore is in practice impossible which can clearly be seen from FIGS. 4 and 5, but by means of the method according to the invention is every kind of machining unnecessary as the laminations edges give the desired perfect periphery. Instead of providing the mandrel with grooves as shown in FIG. 5 it is possible to arrange ridges on an otherwise smooth mandrel and let the laminations edges press against these.

FIG. 6 shows the manufacture of a stator where the windings have been arranged around the yoke components. The mandrel 61 will in this case press against the windings 62 and as the laminations are bent outwards at the edges there will be a tension in the yoke component 63, which tension further will press the windings against the mandrel. By this arrangement penetration of liquid mould compound from the bore 64 into the windings is made difficult or even impossible. It is also possible to arrange some blocking device at the winding sides turned towards the bore. In this manner it is obtained free windings which can be cooled very effectively as well on the outside as on the side turned towards the rotor. A comparatively large free air space is generated between the rotor and the windings. This advantage is of most essential importance for the motor efficiency.

FIG. 7 shows in a partial section an yoke component 70 with a salient pole 71, which is encircled by the winding 72. The yoke component 70 is stacked from laminations 73 in the same manner as described in connection to FIG. 3, but the laminations are in the salient pole oriented in such a manner that a larger flux density is obtained at the outer flank 74 of the salient pole, whereas a lower flux density is obtained at the central portion 75 of the pole. If a concentrated magnetic flux for any reason is wanted in the central portion salient pole it is possible to arrange the lamination such as shown by the dash outline 76.

A simple way to adjust the magnetic flux is as mentioned hereabove to alter the thickness 77 of the laminations. A continuous reduction of the lamination thickness 77 from the center of the pole out towards the flanks can, for instance, compensate the fact that the central laminations are longer than the flank laminations.

The edges of the laminations, which follow the stator bore can also be given a gentle spiral form thereby that they are angle-sheared or they can be split open and formed aiming at a variation of the magnetic flux.

Figure 8:
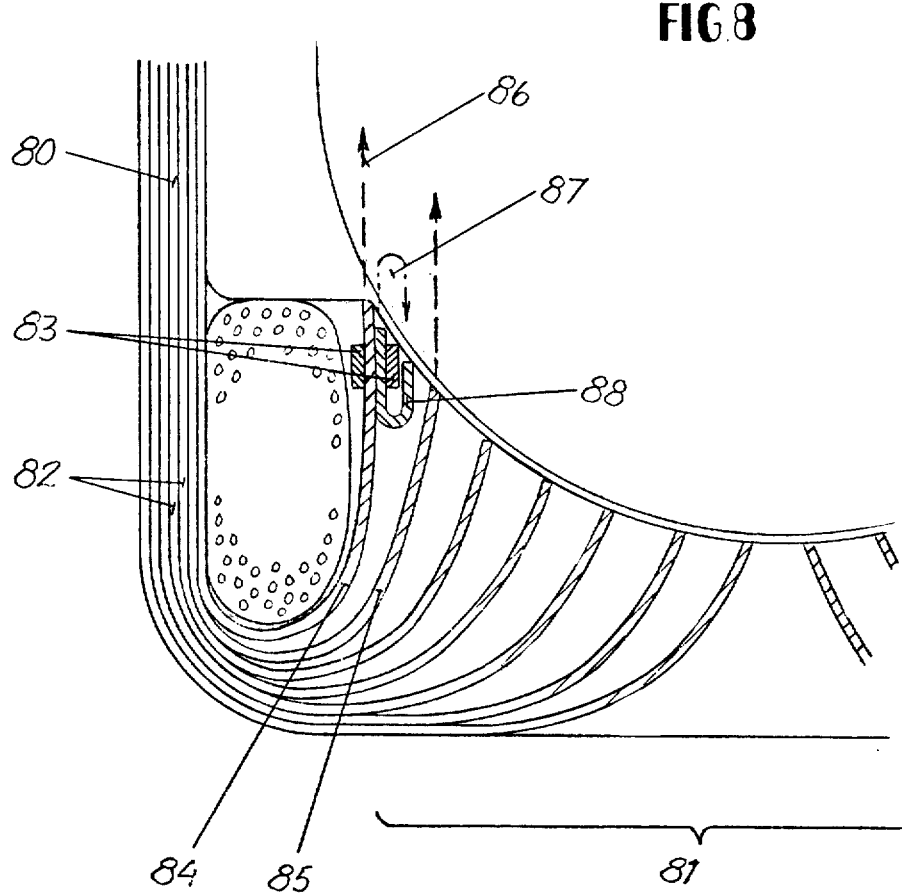

FIG. 8 shows a partial section of a motor type generally referred to as a "shaded pole motor." The figure shows an yoke component 80 with a salient pole 81, both of which are formed by laminations 82 stacked in the manner described in connection to FIGS. 2–4. An induction coil 83 has been fitted between the flank laminations 84 and 85 of the salient pole 81 in order to give the motor a certain starting torque. A closed smaller magnetic flux 87 is obtained in the particular bent lamination 88 where the main magnetic flux 86 passes through the induction coil 83.

FIG. 9 shows in a greatly enlarged view an embedded lamination 90. Before the moulding mandrel is inserted into the mould die the laminations 91 assume the positions shown in broken lines designated by the diameter $D_1$. After the pouring of the mould compound the laminations follow the lamination diameter $D_2$. The tolerance on this measure can be made extremely narrow in order to make the air gap $q_1$ between rotor $D_3$ and stator $D_2$ electrically optimal. The air gap losses can hereby be maintained small as compared to the common losses at conventional motors of this type. The size of air gap q2 is shown in the figure for comparison in the same scale. The magnetic flux is marked with numeral 92 on FIG. 9. It is obtained a tangential dispersion of the magnetic flux if the lamination 90 is split open and is bent up to any stepped form.

Figure 10A:
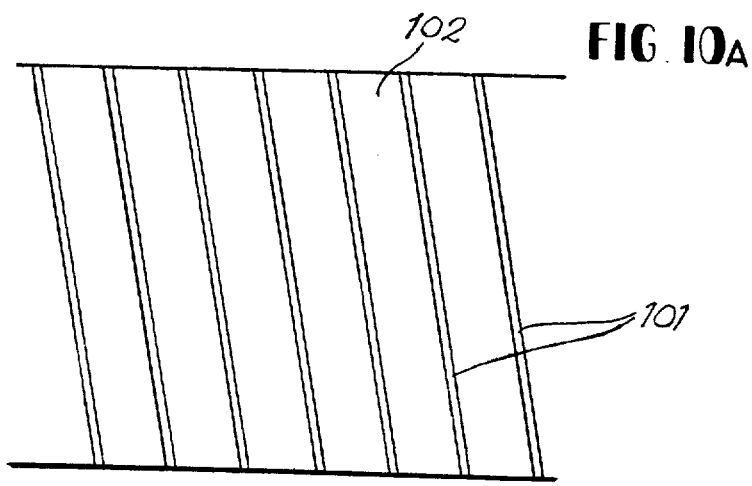
FIGS. 10a and 10b show the design of the laminations edges adjacent the stator bore.
Figure 10B:
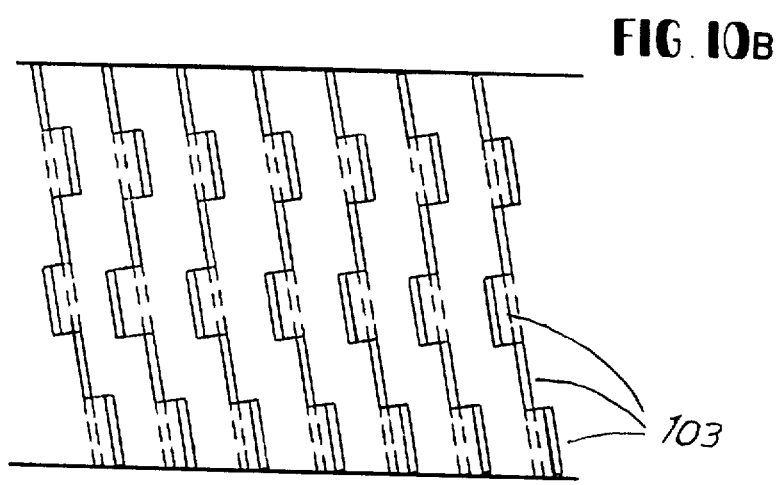

FIGS. 10a and 10b show how the edges of the laminations are arranged as seen from the stator bore. In FIG. 10a the edges 101 are straight but they are given a spiral form. The edges are embedded in the mould compound 102. In order to obtain a dispersion of the magnetic flux has the edges, as shown in FIG. 10b, been split open and bent outwards whereby stepped formations 103 has been obtained at the edges.

Figure 11:
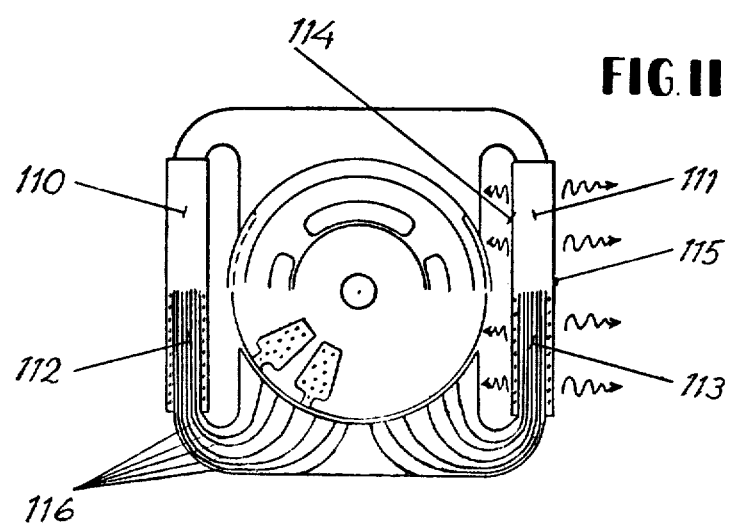
FIG. 11 is a partial end view and section of an especial winding arrangement.

FIG. 11 shows a partial end view and section of another motor embodiment comparable to FIG. 2. The motor according to FIG. 2 has its salient poles encircled by two current coils. These coils have according to the embodiment shown in FIG. 11 been replaced by coils 110 and 111 which are arranged to encircle the yoke components 112 and 113 of the motor. This arrangement gives very large advantages as the same number of ampere-turns as in FIG. 2 in this embodiment will get a heavily increased radiation volume. The coils are thin and have large cooling surfaces 114 and 115 as well out towards the surroundings as inwards against the air stream generated by the rotor. The windings heads of the current coils can be kept at minimum and the motor will thereby get smaller overall measures. This arrangement is possible as the magnetic flux generated by the coil already inside the coil is divided on the laminations 116, which thereupon directly and independent of each other lead the flux to the portion of the salient pole where the lamination follows the stator bore.

FIGS. 12a and 12b show in simple perspective views on one hand a conventional motor 121 and on the other hand a motor 122 for the same power output but constructed in accordance with the embodiment shown in FIG. 11. These figures show clearly the dimensional gains.

What is claimed is:

1. Method of making a stator for electric motors comprised of a plurality of laminations arranged with their sides in the direction of the rotor axis, the edge portions of the laminations running in the axial direction being bent inwardly towards the stator bore and maintained in spaced-apart relation at a predetermined position and being permanently fixed in this position solely by means of a moulded compound each main pole consisting of the lamination edges of two adjacent lamination stacks, each lamination stack consisting of undivided laminations comprising a north and a south pole, consisting of the steps of positioning the laminations between a pair of inner and outer mould members wherein the inner mould member has means for supporting the terminal edges of the laminations in predetermined spaced-apart relation and disposed along the circumference of a circle and thereafter permanently fixing the terminal edges of the laminations in relation to one another by means of a moulding mass in the spaces between the laminations adjacent their terminal edge portions.

2. A method according to claim 1 including the step of pressing the inner mould member against the yoke portions.

3. A method as claimed in claim 1 including the steps of initially bending the edge portions of the laminations inwardly so that their edges lie generally on the periphery of a circle having a predetermined diameter and engaging the edge portions with the inner mould member to position them along a circle having a larger diameter than said predetermined diameter.

4. A method for producing a stator according to claim 1 wherein the inner mould member comprises a mandrel having an outer peripheral surface wherein the laminations which are previously bent, together with windings and the mandrel are inserted into the outer mould and that a mould compound thereupon is introduced into the space between the inner and outer mould members and is hardened.

5. A method according to claim 4, characterized thereby that when the laminations are placed in the outer mould member, the edges define a circular cavity for the stator bore having a diameter smaller than the diameter of the stator bore whereby upon insertion of the mandrel into the cavity, the lamination edges are pressed outwardly and abut the mandrel.

6. A method according to claim 5, whereby there are arranged grooves or ridges for guiding of the laminations edges on the outer peripheral surface of the mandrel.

7. A method according to claim 4, whereby the mandrel is pressed against the yoke portions.

* * * * *